United States Patent [19]

Valenta

[11] Patent Number: 4,528,450
[45] Date of Patent: Jul. 9, 1985

[54] METHOD AND APPARATUS FOR MEASURING RADIOACTIVE DECAY

[75] Inventor: Robert J. Valenta, Berkeley, Ill.

[73] Assignee: Packard Instrument Company, Inc., Downers Grove, Ill.

[21] Appl. No.: 416,779

[22] Filed: Sep. 10, 1982

[51] Int. Cl.$^3$ ............................................. G01T 1/20
[52] U.S. Cl. .................................. 250/362; 250/364; 250/369
[58] Field of Search ............... 250/361 R, 363 R, 364, 250/369, 362

[56] References Cited

U.S. PATENT DOCUMENTS

| | | | |
|---|---|---|---|
| 3,842,278 | 10/1974 | Noakes | 250/369 |
| 4,031,392 | 6/1977 | Giraud et al. | 250/369 |
| 4,071,761 | 1/1978 | Horrocks | 250/369 |

Primary Examiner—Alfred E. Smith
Assistant Examiner—Carolyn E. Fields
Attorney, Agent, or Firm—Robert P. Hayter

[57] ABSTRACT

Method and apparatus for counting nuclear scintillations of a specimen containing tritium. A simple system using a single photomultiplier tube and suitable circuitry segregates the pulses which are emitted from a scintillator due on interaction with a nuclear particle from the pulses attributable to random noise. The system is operable with many scintillation materials as long as the characteristic output from the scintillator is long relative to the duration of a random noise pulse. The preferred embodiment of this radiation assay instrument includes a solid scintillator, a photomultiplier tube whose output is split among a two-path circuit containing a first path for providing an integrated pulse signal as input to a pulse height analyzer and a second path which discriminates based on the number of component pulses in the signal to provide an enable signal to the pulse height analyzer. Also discussed is the response of an apparatus in accordance with the present invention if some relatively high energy isotopes such as carbon-fourteen are tested.

4 Claims, 4 Drawing Figures

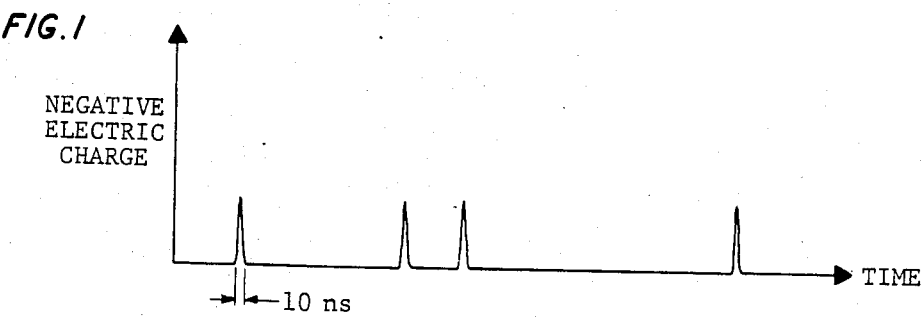
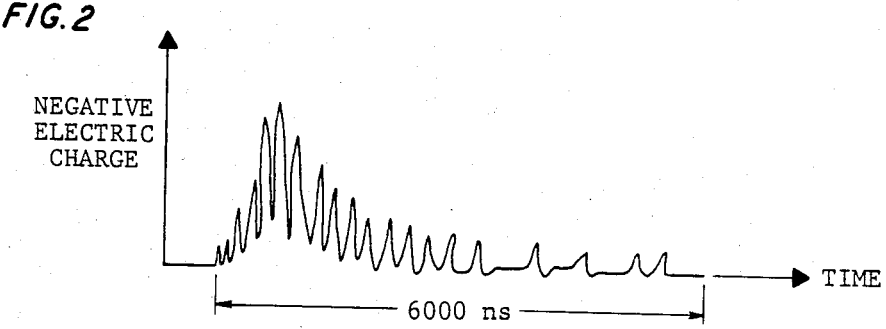
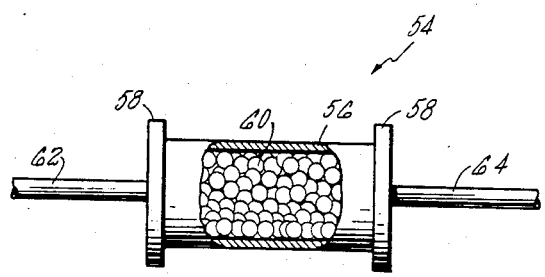

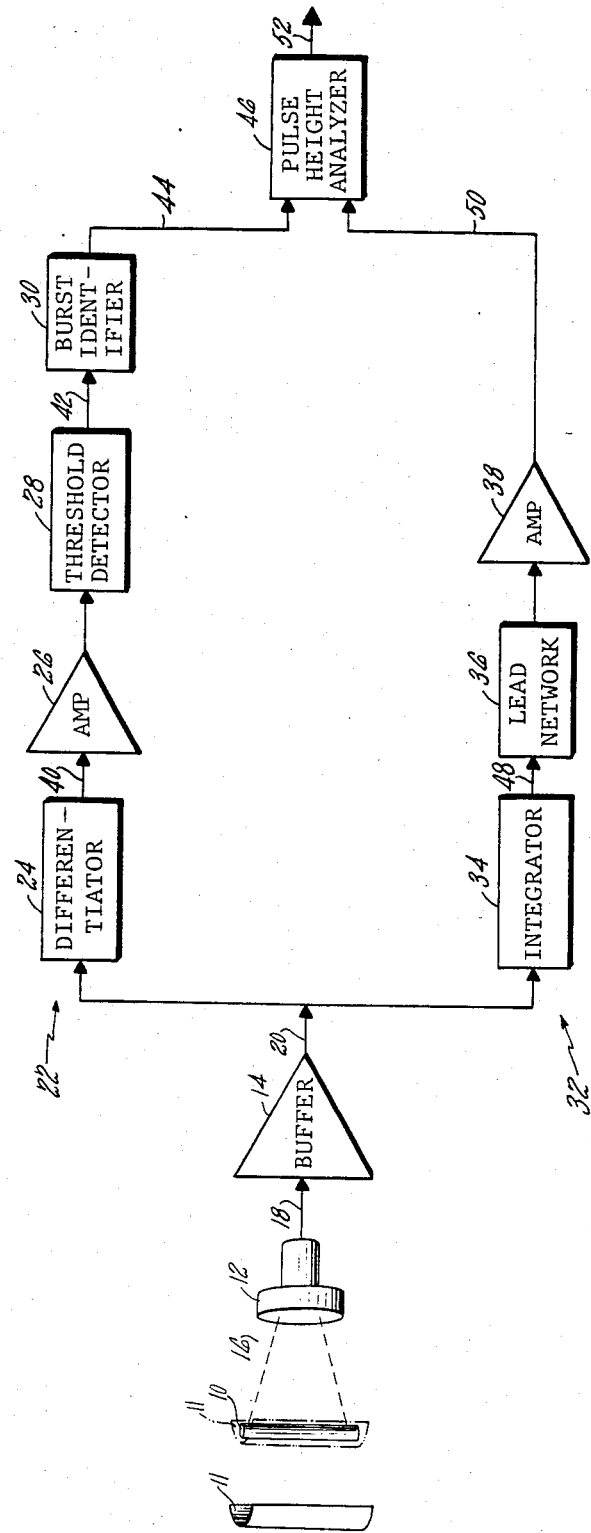

METHOD AND APPARATUS FOR MEASURING RADIOACTIVE DECAY

BACKGROUND OF THE INVENTION

The present invention relates to an instrument for assaying radioactivity. More particularly, the invention relates to a photon detector having a solid scintillator and a single photomultiplier tube.

The counting of nuclear disintegrations emitted from select specimens is frequently accomplished with scintillator materials, photomultiplier tubes and associated circuitry including a pulse height analyzer. For a typical system a specimen of radioactive material is admixed with a liquid scintillator or is placed in the vicinity of a solid scintillator in close proximity to a photomultiplier tube. As the radioactive material decays, the emitted particles interact with the scintillator producing light photons which are collected by the photomultiplier tube. The tube in turn provides an electric signal output and with suitable intermediate circuitry the pulse height analyzer provides an output count for each photomultiplier tube signal which meets some preselected amplitude requirements. A practical consideration which the described system has to contend with is the appropriate recognition of the output signals from the photomultiplier tube. These tubes have a high gain and often produce spurious signals which are simply noise. This noise is particularly troublesome to any attempt to quantitatively analyze a radioactive sample particularly under circumstances in which the count rate from the sample is relatively low or the energy of the radiation from the active nuclide is low. These considerations are fundamental concerns in the design of nuclear detection instrumentation.

One of the more common techniques for distinguishing the events of interest from noise in the output signals from the photomultiplier tube is to use two photomultiplier tubes to collect photons from the scintillation material and compare their output signals. In order for a signal to be considered by the pulse height analyzer a coincident signal must be received from each of the tubes thereby essentially eliminating the possibility of random noise being confused with a genuine nuclear event in the scintillator. Detection instruments with two photomultiplier tubes are routinely used on a commercial basis although there is incentive to continually upgrade such systems particularly if they can be made less elaborate or more efficient as a counter for particles of certain energies.

One attempt at simplifying a solid scintillator system is described by D. Landis et al in a paper entitled "The Application of Pulse Shape Discrimination to Separating Phototube Noise Pulses from Scintillation Pulses" dated Sept. 1, 1964. The device is simple in that only one photomultiplier tube is required. The essence of its operation involves measuring the width of the filtered pulse from the photomultiplier tube by timing the interval between the leading edge and zero crossing. Those pulses shorter than a preselected interval are attributed to noise and are therefore discarded while those pulses exceeding a minimum time interval are considered valid pulses resulting from a nuclear disintegration captured by the scintillator and are recorded. A similar pulse discrimination scheme is used with a flow gas system disclosed by Colmenares et al in a 1974 article entitled "A European Doped Calcium Fluoride Scintillator System for Low Level Tritium Detection." While the Landis et al and Colmenares et al type systems are useful, each has drawbacks. One such drawback, for example, is a poor signal to noise ratio for low energy pulses.

In an article by L. N. Mackey et al entitled "High efficiency Solid Scintillation Radioactivity Detection for High Performance Liquid Chromatography", the authors disclosed related technology applied to the design of a carbon-fourteen monitor. The system uses optimized electronics and particularly sized solid scintillator material in what is referred to as a heterogenous detector, i.e., the radioactive effluent is recoverable intact since it does not become mixed with a liquid scintillator. The system apparently is very good although two photomultiplier tubes are required.

SUMMARY

An object of the present invention is to provide radioactivity monitoring using only one photomultiplier tube. Another object is to be able to discriminate between the electric signals resulting from the noise inherent in a photomultiplier tube and the signals resulting from the interaction of radioactive decay particles with a scintillator material. These goals are achieved by a novel pulse discrimination circuit employing a photon counting technique.

The present invention is predicated on the acknowledgment that the output pulse shape from the photomultiplier tube monitoring the interaction between a liquid scintillator and nuclear radiation is identical to the output from the photomultiplier tube due to random noise. The invention is also predicated on the recognition that the output signal from a photomultiplier tube monitoring a solid scintillator event is actually a burst or continuum of component pulses extending over an interval of time which is long compared to the time duration of a tube noise pulse. Each component pulse is the photomultiplier tube response to a single photon. According to the present invention, a single photomultiplier tube is combined with amplifiers, a photon pulse counter, timers, and a pulse height analyzer forming a new pulse discriminating circuit that discriminates between tube noise pulses and pulses representing genuine nuclear events by recognizing that pulses representing a genuine nuclear event occur in bursts and that tube noise pulses do not. More specifically, this radiation assay instrument includes a solid scintillator, a photomultiplier tube whose output is split among a two-path circuit containing along a first path means for providing an integrated pulse signal as input to a pulse height analyzer and containing in a second path means for discrimination which is based on the number of component pulses in the signal and for providing an enable signal to the pulse height analyzer. The measurement of radiation with such equipment involves interacting radiation from the specimen with a solid scintillator material, capturing the light consequently emitted from the scintillator with a photomultiplier tube, buffering the resultant electric signal from the photomultiplier tube, integrating such buffered signal in the first of two parallel circuits to provide a smooth contour signal as input to a pulse height analyzer, differentiating the buffered signal in the second of the two parallel circuits to reduce each such signal to a series of sequenced component pulses, producing an output count with the pulse height analyzer for those smooth contour signals which fall within a preselected voltage range and contain at least a minimum number of component pulses as discerned by the burst identifier.

One of the distinguishing features of the present invention is that the system requires only one photomultiplier tube. In addition, a solid scintillator is used to detect the radiation and this type scintillator produces a burst of photons which individually occur at a rate far in excess of the rate of any random pulses from the photomultiplier tube due to noise. The result is an assay instrument with improved counting efficiency as well as minimum detection level which is particularly useful for assaying beta and weak gamma emitting radionuclides. Since the instrument requires only one photomultiplier tube, the overall system is correspondingly less complicated and lower cost. The system encompassing the invention requires no premixing of solvents. The radioactive solution passes around the solid scintillator permitting radionuclide decay to activate the solid scintillator with subsequent bursts of light photons proportionate to the energy of the nuclide. The liquid stream containing the radionuclide is completely recovered unchanged. Thus, the sample is easily recovered.

The recited as well as other features, objects, characteristics and advantages of the present invention will become more apparent with the reading and comprehension of the drawing and the description of preferred embodiments which follow.

DESCRIPTION OF THE DRAWING

FIG. 1 is a curve showing the electric charge and duration relationship for a typical electric output signal from a photomultiplier tube due to spurious tube noise;

FIG. 2 is a curve showing the electric charge and duration relationship for a typical electric output signal from a photomultiplier tube in response to the photons produced in a solid scintillator by a nuclear disintegration;

FIG. 3 is a simplified block diagram showing the main components of a radiation assay instrument using a single photomultiplier tube in accordance with the present invention; and FIG. 4 is a simplified high pressure flow cell containing solid scintillator material in accordance with the present invention.

BRIEF DESCRIPTION OF A PREFERRED EMBODIMENT

The present invention allows a radiation monitor to operate with the simplicity of one photomultiplier tube and avoids the problems of timing the leading edge to zero crossing of pulses as is required in the Colmenares et al and Landis et al articles. Random pulses from a photomultiplier tube are commonly referred to as tube noise and appear as electric pulses approximately ten nanoseconds in duration such as is shown in FIG. 1. While the pulses do occur randomly, the time between pulses is typically in the neighborhood of one hundred thousand nanoseconds. With the use of a solid scintillator the photomultiplier tube output due to a photon burst from the scintillator is typically as is shown in FIG. 2. The photon pulse burst is characteristically spread over an interval of several microseconds. This characteristic is used to advantage in accordance with the present invention in a system having a solid scintillator material in the form of fine granules in a high pressure flow cell (FIG. 4) which involves the use of a single photomultiplier tube as is represented schematically in FIG. 3.

A flow cell 10 having suitable reflector means 11 and packed with solid scintillator material is located adjacent to a photomultiplier tube 12 which feeds a buffer 14. The scintillator produces optical pulses 16 which impinge on the photomultiplier 12 and result in an electric charge output signal 18 which is converted to a voltage signal with enhanced drive capability by the buffer 14 and becomes buffered signal 20. The buffered signal is split in two and follows a first parallel path 22 which comprises a differentiator 24 a first amplifier 26, a threshold detector 28 and a burst identifier 30 and a second parallel path 32 which comprises an integrator 34, a lead network 36 and a second amplifier 38.

The differentiator looks at the buffered signal and breaks it down into component or photon response pulses 40 which are amplified and input to the threshold detector. Pulses that exceed a certain threshold voltage emerge as digital output pulses 42. The burst identifier then interrogates the threshold detector output and each time an arbitrarily preselected number of pulses occurs within a somewhat arbitrarily preselected time duration, an enable signal 44 is passed to a pulse height analyzer 46. In accordance with a preferred embodiment of the present invention three pulses occurring within a seven hundred fifty nanosecond duration will precipitate an enable signal indicating the occurrence of a genuine nuclear event. This preselected time interval is not absolute and may be increased or decreased in duration by a few hundred nanoseconds with no functional deviation from the present invention. Further, two pulses or four or more pulses occurring during the prescribed interval will work although not as well. Alternatively, particularly with systems using radioisotopes such as carbon-fourteen capable of emitting relatively high energy particles, interrogation of the threshold detector may result in a continuous or near continuous signal which is longer than the response of the threshold detector to a single photon pulse and is caused by overlapping photon pulses. Under such circumstances, the continuous signal may have a duration of approximately two hundred to four hundred nanoseconds. In all such instances, the burst identifier will provide an enable signal to the pulse analyzer.

Similarly, the integrator looks at the buffered signal and by an integration process produces a smooth contoured integrated pulse 48. The integrated pulse is then shaped into a bipolar pulse by lead network 36 and after being amplified by the amplifier 38 emerges as an amplified bipolar pulse 50 which is fed to the pulse height analyzer 46. Each time the pulse analyzer receives an enable signal 44 and a corresponding bipolar pulse 50 which satisfies the pulse height criteria set in the analyzer an output count 52 is produced. Each output count corresponds to a nuclear disintegration of interest which caused an optical pulse 16 from the scintillator and is transmitted to the microprocessor circuitry for proper analysis of the data.

A flow cell 54 for use with the present invention is shown in FIG. 4. The cell comprises a glass-walled centerpiece 56 having a filter element 58 at each end as is filled with a fine mesh solid scintillator material 60 such as calcium fluoride or any of a number of glass scintillators. Inlet tube 62 and outlet tube 64 deliver and carry away respectively the fluid containing the radioactive material of interest. Typical dimensions for the cell are two inches in length, eight millimeters outside diameter and a two to five millimeter inside diameter. The tubes are metal with chromatographic grade end fittings and filters and the scintillator particles are smaller than one hundred eighty mesh. With this apparatus a flow rate of one quarter to two milliliters per minute is maintained and results in a pressure drop of fifty to three hundred pounds per square inch between the filter elements. The flow cell is used in conjunction with a high efficiency reflector to maximize the photon flux which reaches the photomultiplier tube. The system may also be utilized to measure radioactivity in gas streams.

The invention has been described in terms of calcium fluoride and glass scintillator although the concept is workable with sodium iodide or any other long decay time scintillator material solid or liquid, i.e., one having an output photon burst which is long in comparison with the pulse interval of photomultiplier tube noise.

I have described a preferred embodiment of my invention and some variations thereto and therefore I seek letters patent issued by the United States of America directed to my invention which I claim as:

1. A radiation assay instrument comprising:
   a solid scintillator for providing pulses of photons in response to interaction with radiation;
   photomultiplier tube means to receive the photons from the scintillator and provide an electric output signal;
   reflector means for collecting photons from the scintillator which would not otherwise directly impinge on the photomultiplier tube face and for redirecting them into the photomultiplier tube face; and
   circuitry having two parallel electric paths and including,
      along a first of the parallel electric paths
         integrator means for changing the profile of the electric output signal provided by the photomultiplier tube to a smooth contour signal,
      along a second of the parallel electric paths
         differentiator means for reducing each electric output signal provided by the photomultiplier tube to a sequence of component photon response pulses which comprise the electric output signal, and
         burst identifier means for
            interrogating the sequence of component photon response pulses, and
            providing an enable signal for each occurrence of a sequence consisting of more than one component photon response pulses that occur within a specified time interval and
      pulse height analyzation means for
         receiving the smooth contour signals from the pulse integrator means, receiving the enable signals from the burst identifier, and
         providing an output count signal for each occurrence of an enable signal and a corresponding smooth contour signal whose pulse height satisfies specified amplitude requirements.

2. The invention according to claim 1 wherein the sequence of component photon response pulses consists of three pulses.

3. The method of assaying radiation from a sample comprising:
   locating the sample adjacent to a solid scintillator to allow the radioactive particles from the sample to interact with the scintillator thereby producing photons;
   collecting the photons with a photomultiplier tube to produce an electric output signal;
   dividing each such electric output signal into identical at least first and second split electric output signals;
   integrating the first split electric output signal to provide a smooth contour signal;
   differentiating the second split electric output signal to reduce such second signal to the sequence of component photon response pulses;
   interrogating the sequence of component photon response pulses with a burst identifier to determine if the sequence contains at least three components occuring within seven hundred and fifty nanoseconds;
   providing with the burst identifier an enable signal to a pulse height analyzer each time a second split electric output signal is determined to have at least three component photon response pulses occurring within seven hundred and fifty nanoseconds;
   coordinating the arrival of an enable signal in the pulse height analyzer with the arrival of any smooth contour signal which is determined by the pulse height analyzer to have a pulse height that satisfies preselected amplitude requirements; and
   providing an output count from the pulse height analyzer each time a smooth contour pulse is correlated to an enable pulse.

4. A radiation assay instrument comprising:
   a solid scintillator for providing pulses of photons in response to interaction with radiation;
   photomultiplier tube means to receive the photons from the scintillator and provide an electric output signal;
   reflector means for collecting photons from the scintillator which would not otherwise directly impinge on the photomultiplier tube face and for redirecting them into the photomultiplier tube face; and
   circuitry having two parallel electric paths and including,
      along a first of parallel electric paths
         integrator means for changing the profile of the electric output signal provided by the photomultiplier tube to a smooth contour signal,
      along a second of the parallel electric paths
         differentiator means for reducing each electric output signal provided by the photomultiplier tube to a sequence of component photon response pulses which comprise the electric output signal, and
         burst identifier means for
            interrogating the sequence of component photon response pulses, and
            providing an enable signal for each occurrence of overlapping photon response pulses which is greater than about two hundred nanoseconds duration, and
   pulse height analyzation means for
      receiving the smooth contour signals from the pulse integrator means,
      receiving the enable signals from the burst identifier, and
      providing an output count signal for each occurrence of an enable signal and a corresponding smooth contour signal whose pulse height satisfies specified amplitude requirements.

* * * * *